(12) United States Patent
Matsukawa et al.

(10) Patent No.: US 7,934,947 B2
(45) Date of Patent: May 3, 2011

(54) ELECTRONIC APPARATUS WITH MOVABLE CASINGS CONNECTED BY AN U-SHAPED WIRE HARNESS

(75) Inventors: Takashi Matsukawa, Sakura (JP); Kazuo Tanihira, Sakura (JP); Shigeru Ashida, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/524,663

(22) PCT Filed: Jan. 29, 2008

(86) PCT No.: PCT/JP2008/051313
§ 371 (c)(1),
(2), (4) Date: Jul. 27, 2009

(87) PCT Pub. No.: WO2008/096643
PCT Pub. Date: Aug. 14, 2008

(65) Prior Publication Data
US 2010/0093207 A1    Apr. 15, 2010

(30) Foreign Application Priority Data

Feb. 5, 2007    (JP) .................................. 2007-025506

(51) Int. Cl.
*H01R 11/00* (2006.01)
(52) U.S. Cl. ....................................................... 439/502
(58) Field of Classification Search ................. 439/502, 439/10, 11, 32; 455/575.4, 575.1, 550.1; 174/52 A; 361/752
See application file for complete search history.

(56) References Cited

U.S. PATENT DOCUMENTS

| | | | |
|---|---|---|---|
| 6,531,657 B1 * | 3/2003 | Jones et al. | 174/72 A |
| 7,098,404 B2 | 8/2006 | Hirata et al. | |
| 7,406,763 B2 | 8/2008 | Hirata et al. | |
| 7,410,360 B2 * | 8/2008 | Pan | 439/10 |
| 2004/0160748 A1 * | 8/2004 | Takagi et al. | 361/752 |
| 2005/0221873 A1 | 10/2005 | Kameyama et al. | |
| 2006/0099851 A1 * | 5/2006 | Duarte et al. | 439/502 |

FOREIGN PATENT DOCUMENTS

| | | |
|---|---|---|
| EP | 1416781 A1 | 5/2004 |
| EP | 1499093 A1 | 1/2005 |
| JP | 4-195313 A | 7/1992 |
| JP | 2003-46275 A | 2/2003 |
| JP | 2003-319042 A | 11/2003 |
| JP | 2005-141923 A | 6/2005 |
| JP | 2005-235690 A | 9/2005 |
| WO | 03/013205 A1 | 2/2003 |
| WO | 03092251 A1 | 11/2003 |

OTHER PUBLICATIONS

International Search Report issued in PCT/JP2008/051313, date of mailing Apr. 8, 2008.

* cited by examiner

*Primary Examiner* — Chandrika Prasad
(74) *Attorney, Agent, or Firm* — Westerman, Hattori, Daniels & Adrian, LLP

(57) ABSTRACT

An electronic apparatus includes: a plurality of casings that are mounted so as to be movable relative to each other and have circuits provided therein; and an electric wire that electrically connects the circuits provided in the casings. The electronic wire has a harness structure that includes a plurality of wires and connection portions provided at both ends of each of the plurality of wires, and connection portions of the casings to the harness are arranged such that a line linking the connection portions is not parallel to a direction in which the plurality of casings are moved.

5 Claims, 8 Drawing Sheets

ELECTRONIC APPARATUS WITH MOVABLE CASINGS CONNECTED BY AN U-SHAPED WIRE HARNESS

TECHNICAL FIELD

The present invention relates to an electronic apparatus, such as a mobile phone or a portable personal computer, in which a plurality of casings having circuits provided therein are mounted so as to be movable relative to each other and the circuits provided in the casings are electrically connected to each other by a wire, such as a micro coaxial cable, and to a harness that is used for wiring between the casings of the electronic apparatus.

Priority is claimed on Japanese Patent Application No. 2007-25506 filed on Feb. 5, 2007, the contents of which are incorporated herein by reference.

BACKGROUND ART

In recent years, rapid progress has been made in the development of techniques to reduce the size and weight of mobile phones, which are a representative example of electronic apparatuses, and to make them multifunctional. As technical trends, in place of flexible printed circuit boards (hereafter, referred to as "FPCs"), there are increasing demands for micro coaxial cable assemblies as internal wiring materials for mobile phones. This is because the transmission characteristics and noise resistance characteristics of micro coaxial cables meet market demands.

Further, there have been demands for a wiring method that makes it possible to use micro coaxial cables even in mechanical constructions which have been regarded to be unsuitable for the use of the micro coaxial cables.

Conventional micro coaxial cable assemblies have been adopted in place of FPCs as internal wiring materials for mobile phones. The mechanical structures of mobile phones which adopt the micro coaxial cable assemblies include an open-close structure, called a "clamshell" type structure, shown in FIG. 7A, a rotating structure, called a "jackknife" type structure, shown in FIG. 7B, and a dual-axis structure enabling both rotation and opening/closing, called a "twist" type structure, shown in FIG. 7C. However, the micro coaxial cable assemblies have not been used for a parallel-displacement structure, called a "slide" type structure, shown in FIG. 7D.

Characteristics required for the slide-type structure include horizontal sliding in a space of a height of 3 mm. In the related art, only FPCs having a thin-film form have been applicable to such a structure. FIG. 8 illustrates an example of the application of an FPC 4 as a wiring material between casings of a slide-type electronic apparatus 1. In the electronic apparatus 1, circuits of a first casing 2 and a second casing 3 that is slidably mounted to the first casing 2 are electrically connected to each other by the FPC 4.

As an example of multi-core cables used in micro coaxial cable assemblies or the like, there have been proposed techniques disclosed in Patent Documents 1 and 2.

Patent Document 1 discloses a multi-core cable in which both ends of each of a plurality of wires are arranged in a flat shape with predetermined pitches and the central portion is bundled into a single cable.

Patent Document 2 discloses a multi-core cable in which a weft is woven among a plurality of wires, and the wires are bundled into a shape approximating a round shape by contraction of the weft.

[Patent Document 1] Japanese Unexamined Patent Application, First Publication No. 2005-235690

[Patent Document 2] Japanese Unexamined Patent Application, First Publication No. 2005-141923

DISCLOSURE OF THE INVENTION

Problems to be Solved by the Invention

However, the above techniques of the related art have the following problems.

As shown in FIG. 8, the slide-type electronic apparatus employing the FPC as a wiring material between the casings has insufficient transmission characteristics and noise resistance characteristics. Further, because the FPC is slid in a small space, the FPC is likely to be creased or broken, which may cause deterioration of the transmission characteristics of the bent portion.

As described above, if micro coaxial cables are used as a wiring material between casings in a slide-type electronic apparatus, the transmission characteristics and noise resistance characteristics can be further improved, as compared to the structure in which the FPC is used as the wiring material. However, the harness structures disclosed in Patent Documents 1 and 2 are used in the clamshell-type and jackknife-type structures, but cannot be applied to the slide-type structure. That is, in these harness structures according to the related art, since a plurality of cables are bundled, it is difficult to maintain a height of 3 mm of sliding space required for the slide-type structure.

FIG. 9 is a reference diagram illustrating the wiring structure of a slide-type electronic apparatus according to the related art. A slide-type electronic apparatus 5 includes a first casing 6 having a first connection portion 8, and a second casing 7 that is slidably mounted to the first casing 6 and has a second connection portion 9. In this slide-type electronic apparatus 5, the connection portions are provided such that a line linking the first connection portion 8 and the second connection portion 9 is parallel to a casing displacement direction 10 (a direction in which the casings slide). Therefore, when a harness 10B shown in FIGS. 10A to 10C is used as the wiring material between the casings, the harness 10B is wired at a harness wiring position represented by reference numeral 10A. FIG. 10A is a front view illustrating the harness 10B, FIG. 10B is a side view thereof, and FIG. 10C is a perspective view thereof.

In general, the micro coaxial cables used in mobile phones range from AWG46 to AWG42, and the outer diameter of the cables is in a range of about 0.2 mm to 0.3 mm. The sliding space used in general slide-type structures requires a height of approximately 3 mm and bending durability of approximately 100,000 cycles or more.

In general, the allowable radius of curvature of micro coaxial cables must be equal to approximately 20 times the outer diameter of the cable. When the outer diameter of the cable is in a range of approximately 0.2 mm to 0.3 mm, for example, 0.25 mm, an allowable radius of curvature of approximately 5 mm is required, so that it is difficult to maintain a height of 3 mm of bending space required for general slide-type structures.

Further, in the conventional harnesses disclosed in Patent Documents 1 and 2, a plurality of cables are bundled together, and they are connected at the wiring position indicated by reference numeral 10A in FIG. 9. When the casing 7 slides to bend the harness in the space of a height of 3 mm, the cable is creased, so that bending durability performance is further deteriorated.

Meanwhile, the harness cables need to maintain a flat shape. However, when a harness without a bundling member is bent, it is difficult to maintain the flat shape of the harness due to cable creasing and stretching.

The present invention was devised in view of the above circumstances, and has as an object the provision of an electronic apparatus in which a micro coaxial cable assembly can be used in a space of a height of 3 mm or less in a slide-type electronic apparatus, and an electronic apparatus wiring harness that is used as a wiring material of the electronic apparatus.

Means for Solving the Problems

In order to achieve the object, according to an aspect of the invention, an electronic apparatus includes: a plurality of casings that are mounted so as to be movable relative to each other and have circuits provided therein; and an electric wire that electrically connects the circuits provided in the casings. The electronic wire has a harness structure that includes a plurality of wires and connection portions provided at both ends of each of the plurality of wires, and connection portions of the casings to the harness are arranged such that a line linking the connection portions is not parallel to a direction in which the plurality of casings are moved.

In the electronic apparatus according to the above-mentioned aspect, the electric wire may include at least one micro coaxial cable.

In the electronic apparatus according to the above-mentioned aspect, the plurality of casings may include a first casing and a second casing that is slidably mounted to the first casing.

In the electronic apparatus according to the above-mentioned aspect, the plurality of wires of the harness may have different lengths.

According to another aspect of the invention, there is provided an electronic apparatus wiring harness that has a harness structure including a plurality of wires and connection portions provided at both ends of each of the plurality of wires, and electrically connects the circuits provided in the casings in the electronic apparatus.

Advantageous Effects of the Invention

According to the above-described aspects of the invention, it is possible to provide an electronic apparatus in which a micro coaxial cable assembly can be used in a space of a height of 3 mm or less in a slide-type electronic apparatus.

According to the above-described aspects of the invention, since the micro coaxial cable assembly can be used in the slide-type electronic apparatus, it is possible to improve transmission characteristics or noise resistance characteristics, as compared to the structure in which an FPC according to the related art is used as a wiring material between the casings.

DESCRIPTION OF THE REFERENCE SYMBOLS

10 CASING DISPLACEMENT DIRECTION
11 ELECTRONIC APPARATUS
12 FIRST CASING
13 SECOND CASING
14 HARNESS WIRING POSITION
15A (CASING-SIDE) FIRST CONNECTION PORTION
15B (HARNESS-SIDE) FIRST CONNECTION PORTION
16A (CASING-SIDE) SECOND CONNECTION PORTION
16B (HARNESS-SIDE) SECOND CONNECTION PORTION
17, 19, 20 HARNESS
18 MICRO COAXIAL CABLE

Best Mode for Carrying Out the Invention

Hereinafter, exemplary embodiments of the invention will be described with reference to the accompanying drawings. However, the invention is not limited to the following embodiments. For example, components of the embodiments may be appropriately combined with each other.

Figure 1:
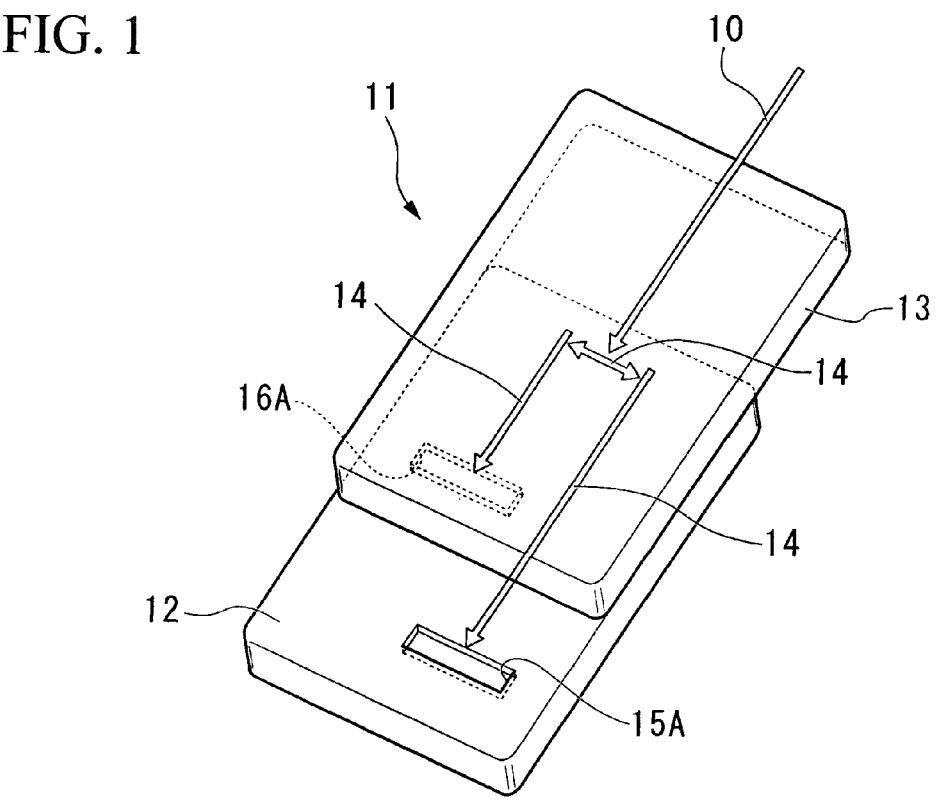
FIG. 1 is a perspective view illustrating an electronic apparatus according to a first embodiment of the invention.
Figure 2A:
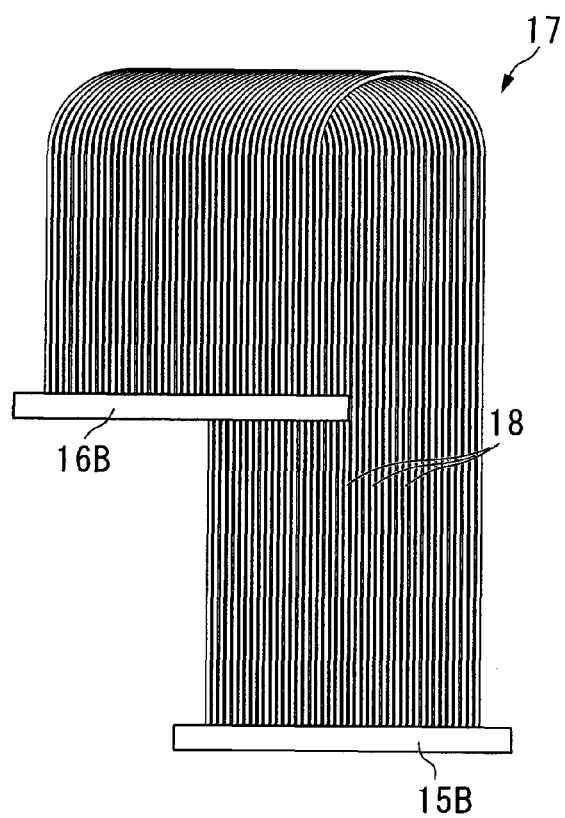
FIG. 2A is a front view illustrating a harness used in the electronic apparatus according to the first embodiment.
Figure 2B:
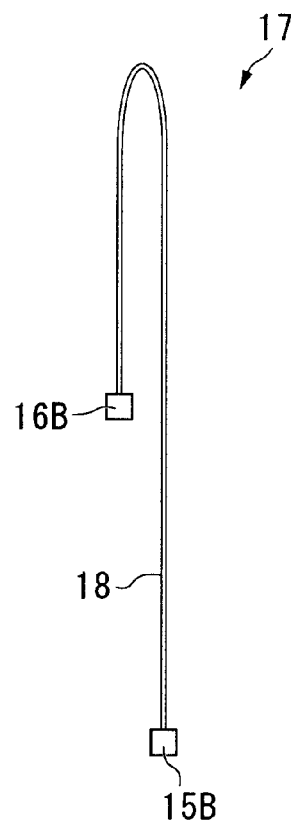
FIG. 2B is a side view illustrating the harness used in the electronic apparatus according to the first embodiment.
Figure 2C:
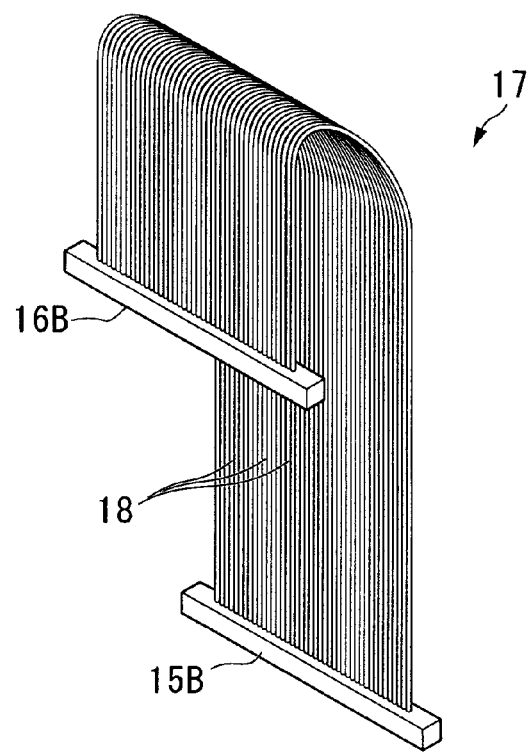
FIG. 2C is a perspective view illustrating the harness used in the electronic apparatus according to the first embodiment.

FIG. 1 is a perspective view illustrating an electronic apparatus according to a first embodiment of the invention. FIGS. 2A to 2C are diagrams illustrating an example of an electronic apparatus wiring harness (hereinafter, simply referred to as a harness) used in an electronic apparatus 11. Specifically, FIG. 2A is a front view illustrating a harness 17, FIG. 2B is a side view thereof, and FIG. 2C is a perspective view thereof. In the drawings, reference numeral 10 denotes a casing displacement direction, reference numeral 11 denotes a slide-type electronic apparatus, reference numeral 12 denotes a first casing, reference numeral 13 denotes a second casing, reference numeral 14 denotes a harness wiring position, reference numeral 15A denotes a first casing-side connection portion, reference numeral 15B denotes a first harness-side connection portion, reference numeral 16A denotes a second casing-side connection portion, reference numeral 16B denotes a second harness-side connection portion, reference numeral 17 denotes a harness, and reference numeral 18 denotes a micro coaxial cable.

In the electronic apparatus 11 according to this embodiment, the two casings 12 and 13 having circuits provided therein are slidably mounted to each other, the circuits provided in the casings 12 and 13 are electrically connected to each other by the harness 17, the harness 17 has the connection portions 15B and 16B provided at both ends of each of a plurality of micro coaxial cables 18, and the connection portions 15A and 16A of the casings to the harness are arranged such that a line linking the connection portions 15A and 16A is not parallel to the casing displacement direction 10.

In this embodiment, as shown in FIGS. 2A to 2C, the harness 17 includes the plurality of micro coaxial cables 18 and the connection portions 15B and 16B that are provided at both ends of each of the micro coaxial cables 18, and the micro coaxial cables 18 are not bound by a binding instrument or a binding tape. In this embodiment, the harness 17 includes a plurality of micro coaxial cables 18, but the harness according to the invention is not limited to this structure. For example, the harness may be formed of a combination of micro coaxial cables and wires other than coaxial cables, such as feed lines. In addition, for example, combinations of the kind of micro coaxial cable 18 used and the winding direction of external conductors are not particularly limited.

In the electronic apparatus 11 according to this embodiment, the slide structure of the first casing 12 and the second casing 13 or the kind of circuits mounted on the casings is not particularly limited. For example, any of known slide structures, casing structures, and circuits that have been used for various electronic apparatuses, such as mobile phones, portable personal computers, portable game machines, and electronic dictionaries, may be used. Further, the electronic apparatus according to the invention is not limited to the slide-type electronic apparatus 11, but the invention can be applied to electronic apparatuses having the structure in which a plurality of casings having circuits provided therein are mounted so as to be movable relative to each other and the circuits in the casings are electrically connected to each other by electric wires. For example, the invention may be applies to different types of mobile phones or the like shown in FIGS. 7A to 7D.

In the electronic apparatus 11 according to this embodiment, the connection portions 15A and 16A of the casings 12 and 13 to the harness are arranged such that a line linking the connection portions 15A and 16A is not parallel to the casing displacement direction 10. Therefore, when the connection portions 15B and 16B of the harness 17 shown in FIGS. 2A to 2C are respectively connected to the connection portions 15A and 16A, the harness 17 is disposed at the harness wiring position 14 shown in FIG. 1 to electrically connect the casings, and the casing 13 slides, it is possible to bend the micro coaxial cables 18 of the harness 17 with a larger radius of curvature than that in a wiring pattern shown in FIG. 9.

Figure 9:
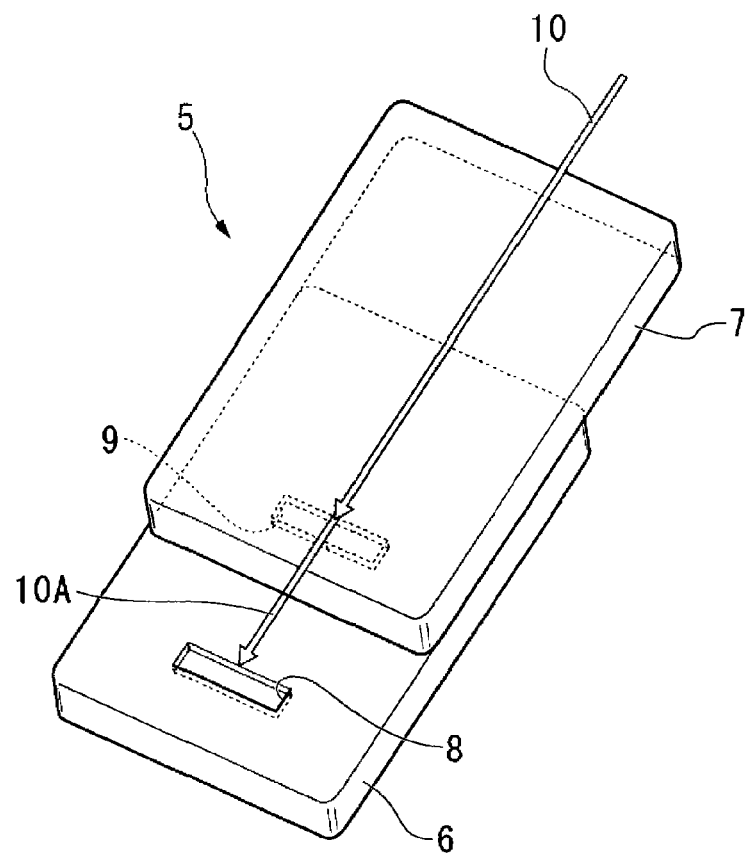
FIG. 9 is a perspective view illustrating a wiring state according to the related art when a harness is used as a wiring material between casings in a slide-type electronic apparatus.
Figure 10A:
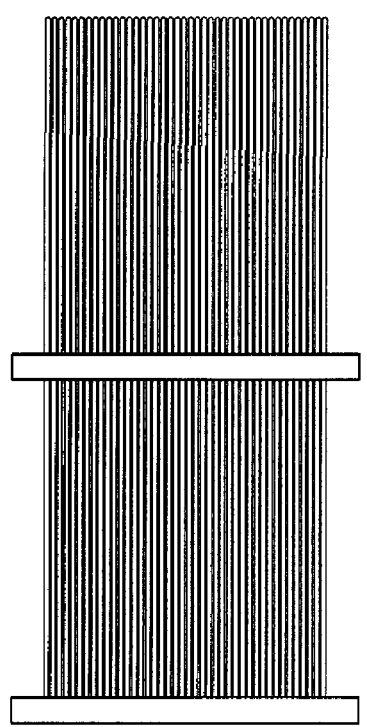
FIG. 10A is a front view illustrating the harness used in the electronic apparatus shown in FIG. 9.
Figure 10B:
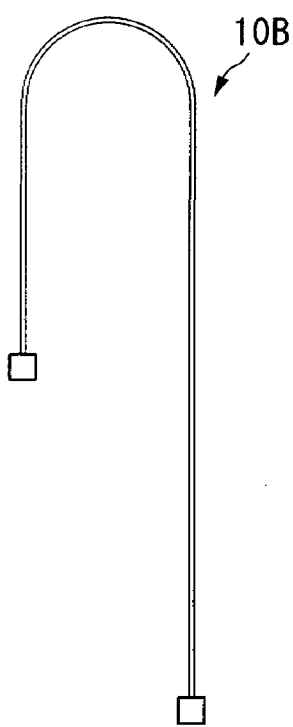
FIG. 10B is a side view illustrating the harness used in the electronic apparatus shown in FIG. 9.
Figure 10C:
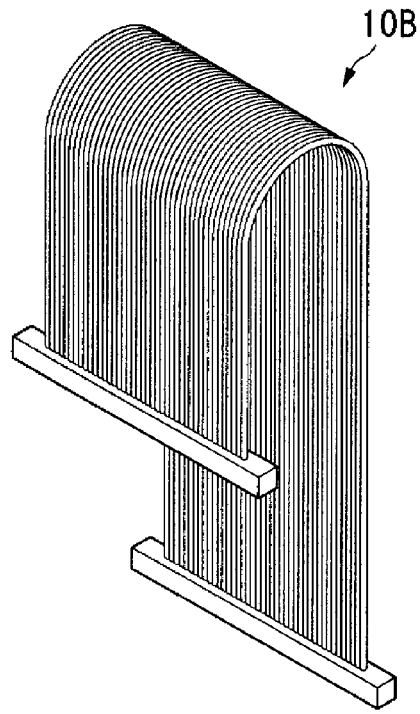
FIG. 10C is a perspective view illustrating the harness used in the electronic apparatus shown in FIG. 9.

In the wiring pattern shown in FIG. 9, the casing displacement direction 10 is parallel to a line linking connection portions 8 and 9. Therefore, when the harness is wired and the casing slides, the radius of curvature of the cables is restricted in the space between the casings. Therefore, when the space is decreased, it is difficult to bend the harness. For this reason, the harness is not used for the slide-type casing according to the related art.

In contrast, in the electronic apparatus 11 according to this embodiment shown in FIG. 1, since the harness 17 is arranged at the harness wiring position 14 shown in FIG. 1, the micro coaxial cables 18 of the harness 17 are arranged in a U shape on the slide surface. Therefore, when the casing slides, the micro coaxial cables 18 are bent with a large radius of curvature.

As a result, in the slide-type electronic apparatus 11 according to this embodiment, it is possible to use a micro coaxial cable harness in a space of a height of 3 mm or less.

In this way, the electronic apparatus 11 according to this embodiment enables the use of a micro coaxial cable assembly. Therefore, it is possible to improve transmission characteristics and noise resistance characteristics, as compared to the structure using the FPC according to the related art as a wiring material between the casings.

Figure 3:
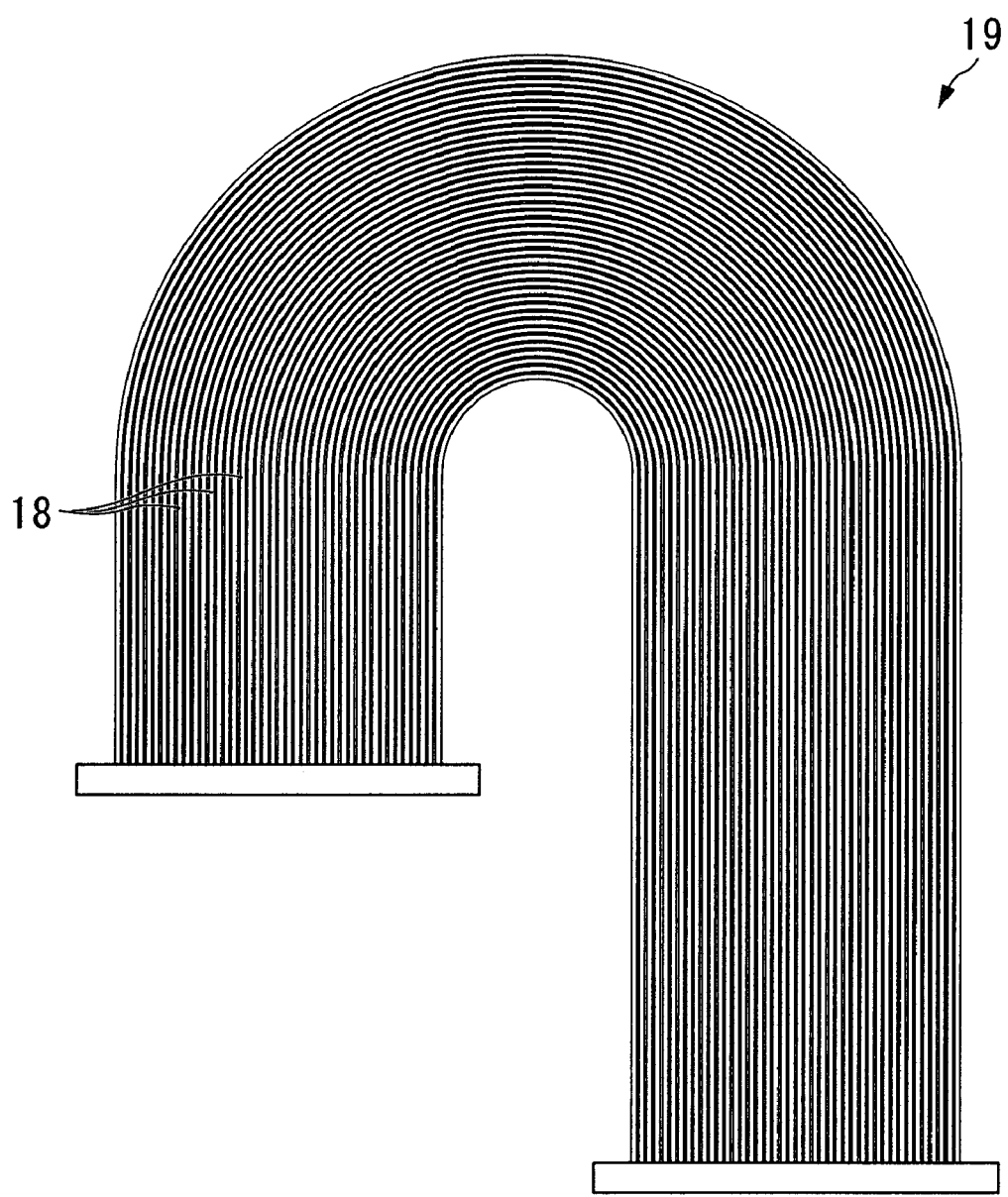
FIG. 3 is a front view illustrating a harness according to a second embodiment of the invention.
Figure 4:
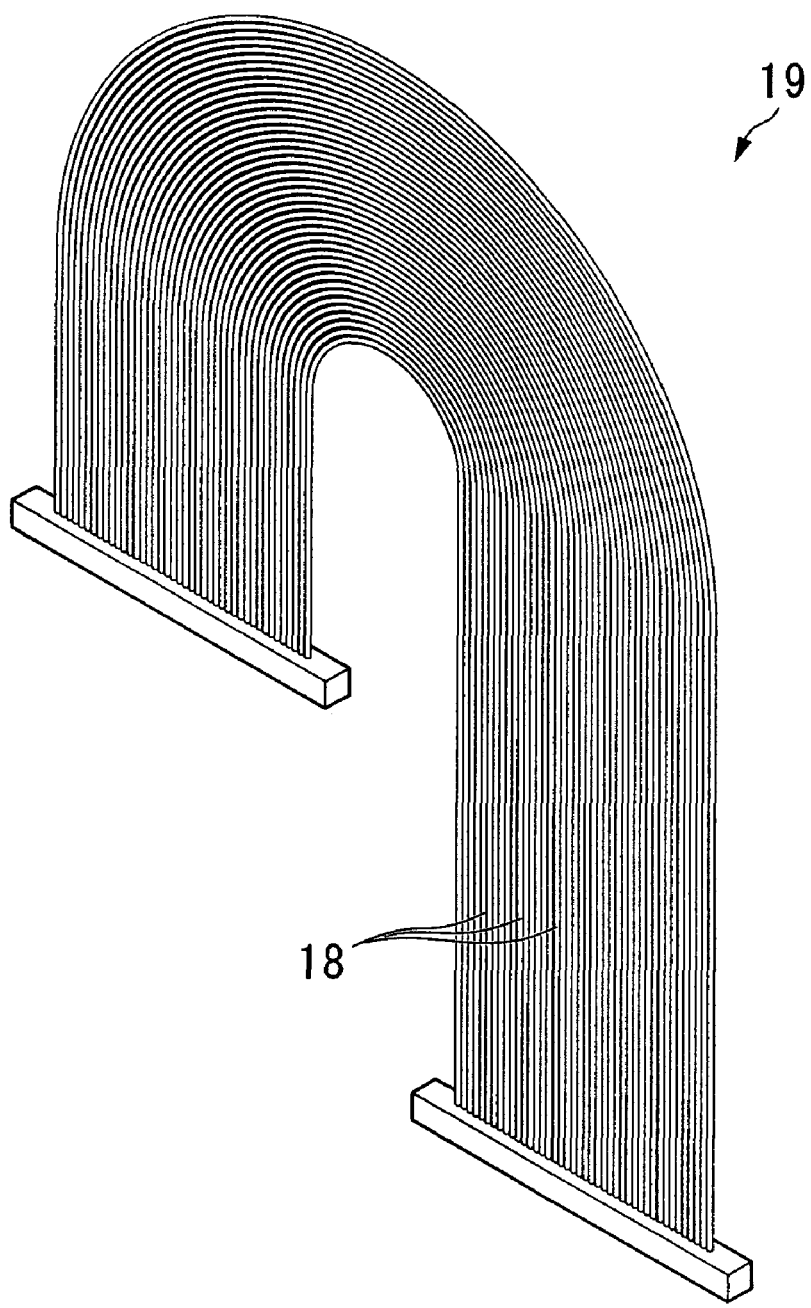
FIG. 4 is a perspective view illustrating the harness according to the second embodiment of the invention.

FIGS. 3 and 4 are diagrams illustrating a second embodiment of the invention.

Specifically, FIG. 3 is a front view illustrating a main part of a harness, and FIG. 4 is a perspective view thereof.

In this embodiment, a harness 19 includes a plurality of micro coaxial cables 18 having different lengths, but the other components of this embodiment have the same structure as those according to the first embodiment.

This embodiment can obtain the same effects as those in the first embodiment. In addition, in this embodiment, since the harness 19 including the plurality of micro coaxial cables 18 having different lengths is used, overlapping portions between the cables can deviate from each other, and thus it is possible to prevent the cables from being broken due to friction between the cables.

Figure 5:
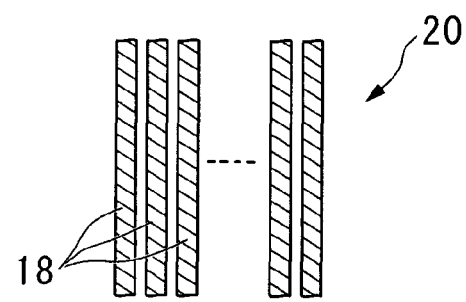
FIG. 5 is an enlarged view illustrating a harness according to a third embodiment of the invention.
Figure 6:
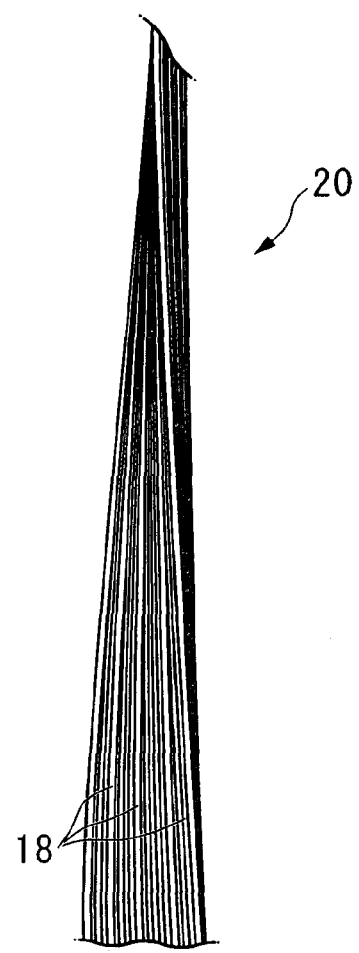
FIG. 6 is a front view illustrating the harness according to the third embodiment of the invention.
Figure 7A:
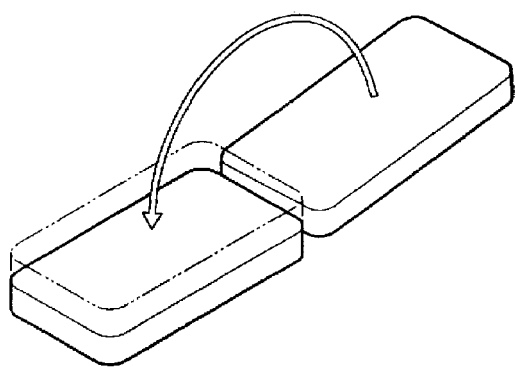
FIG. 7A is a diagram illustrating an example of the displacement of casings of a mobile phone, which is an example of an electronic apparatus.
Figure 7B:
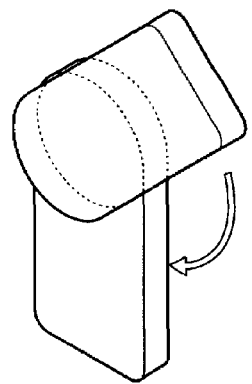
FIG. 7B is a diagram illustrating another example of the displacement of casings of a mobile phone, which is an example of an electronic apparatus.
Figure 7C:
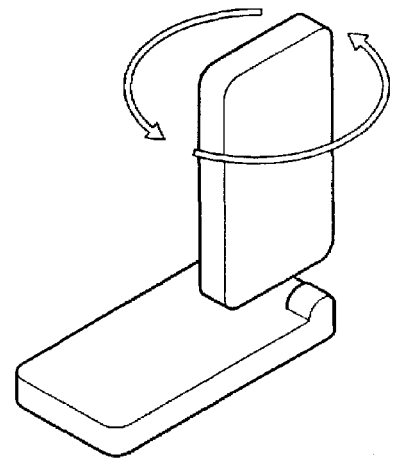
FIG. 7C is a diagram illustrating still another example of the displacement of casings of a mobile phone, which is an example of an electronic apparatus.
Figure 7D:
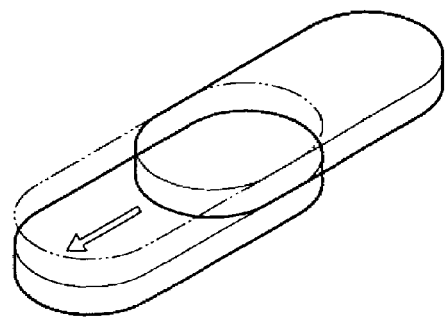
FIG. 7D is a diagram illustrating yet another example of the displacement of casings of a mobile phone, which is an example of an electronic apparatus.
Figure 8:
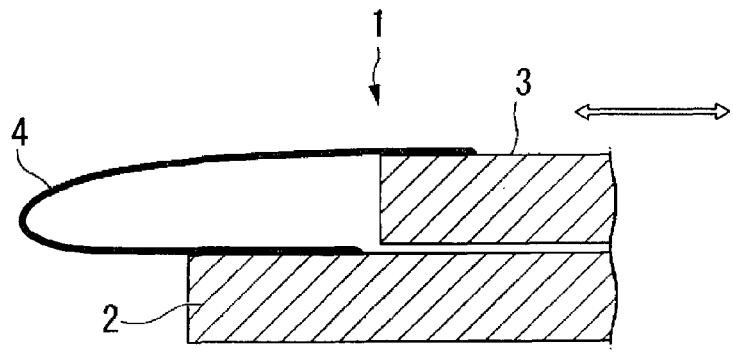
FIG. 8 is a cross-sectional view illustrating the use of an FPC as a wiring material between casings in a slide-type electronic apparatus.

FIGS. 5 and 6 are diagrams illustrating a third embodiment of the invention. Specifically, FIG. 5 is an enlarged view illustrating the winding direction of the outer conductors of the micro coaxial cables 18, and FIG. 6 is a front view illustrating a harness 20.

In this embodiment, all outer conductors of the micro coaxial cables 18 forming the harness 20 are wound in the same direction and the micro coaxial cables 18 are arranged side by side in the horizontal direction.

This embodiment can obtain the same effects as those in the first embodiment. In addition, since all the outer conductors of the micro coaxial cables 18 forming the harness 20 are wound in the same direction and the micro coaxial cables 18 are arranged side by side in the horizontal direction, torsion is applied to the cables. Therefore, as shown in FIG. 6, it is possible to naturally maintain a tape shape and thus reduce stress during bending.

EXAMPLES

Example 1

As the micro coaxial cables, forty AWG46 cables with an outer diameter of 0.24 mm and a length of 65 mm were connected to two connection portions (connectors) to manufacture a harness with the structure shown in FIGS. 2A to 2C.

As shown in FIG. 1, this harness was wired such that each of the connectors of the harness was arranged so as to be shifted 20 mm in a direction perpendicular to the direction in which the casing slides. In this case, the radius of curvature of the cables was 5 mm or greater. The cable accommodation height of the sliding portion was 3 mm.

In this state, the casings were slid continuously to bend the cables, and the number of slides until the cables are broken was studied. Slide tests were conducted under the conditions of a sliding interval of 30 mm and a rate of 30 times/minute.

As a result, no cable breakage occurred in the harness according to this embodiment even when 100,000 or more slides were performed.

Example 2

This embodiment is similar to Example 1 except that micro coaxial cables with a length of 65 mm to 112 mm were used to manufacture the harness shown in FIG. 3, and slide tests were conducted using the harness under the same conditions as those in Example 1.

As a result, no cable breakage occurred in the harness according to this example even when 100,000 or more slides were performed.

Comparative Example

A harness with the same structure as that in Example 1 was manufactured, and the harness was wired such that a line linking the connectors is parallel to the sliding direction of the casings, as shown in FIG. 9 and FIGS. 10A to 10C. The cables of the harness were bent at the cable accommodation height of the sliding portion (3 mm), and in this case, the radius of curvature of the cables was 1.5 mm.

In this state, slide tests were conducted under the same conditions as those in Example 1. As a result, the cables according to the comparative example were broken after an average (n=5) of 8124 slides.

The invention claimed is:

1. An electronic apparatus comprising:
   a plurality of casings that are mounted so as to be movable relative to each other and have circuits provided therein; and
   an electric wire that electrically connects the circuits provided in the casings,
   wherein the electric wire has a harness structure that includes a plurality of wires and harness-side connection portions provided at both ends of each of the plurality of wires,
   wherein the plurality of casings include casing-side connection portions connected to the harness-side connection portions, wherein the casing-side connection portions are arranged such that a line linking the centers of the casing-side connection portions is not parallel to a direction in which the plurality of casings are linearly and slidingly moved, and
   wherein the electric wire is arranged in a U shape on a sliding surface along which the plurality of casings are slidingly moved.

2. The electronic apparatus according to claim 1, wherein the electric wire includes at least one micro coaxial cable.

3. The electronic apparatus according to claim 1, wherein the plurality of casings include a first casing and a second casing that is slidably mounted to the first casing.

4. The electronic apparatus according to claim 1, wherein the plurality of wires of the harness have different lengths.

5. An electronic apparatus wiring harness that has a harness structure including a plurality of wires and connection portions provided at both ends of each of the plurality of wires, and electrically connects the circuits provided in the casings in the electronic apparatuses according to claim 1.

* * * * *